(12) United States Patent
McCaffrey et al.

(10) Patent No.: US 11,199,102 B2
(45) Date of Patent: Dec. 14, 2021

(54) HYDROSTATIC SEAL WITH INCREASED DESIGN SPACE

(71) Applicant: United Technologies Corporation, Farmington, CT (US)

(72) Inventors: Michael G. McCaffrey, Windsor, CT (US); Scott D. Virkler, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 139 days.

(21) Appl. No.: 16/202,810

(22) Filed: Nov. 28, 2018

(65) Prior Publication Data

US 2020/0165928 A1 May 28, 2020

(51) Int. Cl.
| | | |
|---|---|---|
| *F01D 11/02* | (2006.01) | |
| *F01D 11/00* | (2006.01) | |
| *F01D 11/16* | (2006.01) | |
| *F16J 15/44* | (2006.01) | |

(52) U.S. Cl.
CPC .......... *F01D 11/025* (2013.01); *F01D 11/001* (2013.01); *F01D 11/16* (2013.01); *F16J 15/445* (2013.01); *F05D 2220/32* (2013.01)

(58) Field of Classification Search
CPC ...... F01D 11/02; F01D 11/025; F01D 11/001; F01D 11/16; F01D 5/02; F01D 11/08; F01D 11/00; F01D 25/04; F01D 11/003; F01D 11/005; F01D 11/006; F16J 15/442; F16J 15/441; F16J 15/16; F16J 15/445; F05D 2220/32; F05D 2240/55; F05D 2260/38; F05D 2240/56; F05D 2240/11; F04D 29/083; F04D 29/321; F05B 2240/57

See application file for complete search history.

(56) References Cited

U.S. PATENT DOCUMENTS

| | | | |
|---|---|---|---|
| 5,755,445 A | 5/1998 | Arora | |
| 7,182,345 B2 | 2/2007 | Justak | |
| 7,410,173 B2 * | 8/2008 | Justak | ..................... F01D 11/00 277/355 |
| 7,726,660 B2 * | 6/2010 | Datta | ..................... F01D 11/02 277/411 |

(Continued)

FOREIGN PATENT DOCUMENTS

| | | |
|---|---|---|
| CN | 105545375 A | 5/2016 |
| CN | 108005793 A | 5/2018 |

(Continued)

OTHER PUBLICATIONS

European Search Repoort for Applcation No. 19 21 2326; dated Apr. 22, 2020.

(Continued)

*Primary Examiner* — J. Todd Newton
*Assistant Examiner* — Eric J Zamora Alvarez
(74) *Attorney, Agent, or Firm* — Cantor Colburn LLP (57) ABSTRACT

A hydrostatic advanced low leakage seal configured to be disposed relatively rotatable components includes a base. The seal also includes a shoe extending circumferentially. The seal further includes a beam operatively coupling the shoe to the base, the beam having a beam length that is substantially equal to or greater than a circumferential pitch of the shoe.

17 Claims, 4 Drawing Sheets

(56) References Cited

U.S. PATENT DOCUMENTS

| | | | |
|---|---|---|---|
| 7,735,833 B2* | 6/2010 | Braun | F01D 11/02 |
| | | | 277/355 |
| 97,896,352 | 3/2011 | Justak | |
| 8,002,285 B2 | 8/2011 | Justak | |
| 8,172,232 B2 | 5/2012 | Justak | |
| 8,740,225 B2 | 6/2014 | Patterson et al. | |
| 9,145,785 B2 | 9/2015 | Bidkar et al. | |
| 10,060,535 B2 | 8/2018 | Simpson et al. | |
| 10,094,232 B2 | 10/2018 | Mccaffrey et al. | |
| 10,221,714 B2 | 3/2019 | Peters et al. | |
| 2004/0217549 A1 | 11/2004 | Justak | |
| 2007/0018409 A1 | 1/2007 | Justak | |
| 2007/0096397 A1 | 5/2007 | Justak | |
| 2007/0120327 A1 | 5/2007 | Justak | |
| 2008/0100000 A1 | 5/2008 | Justak | |
| 2008/0246223 A1 | 10/2008 | Justak | |
| 2008/0265513 A1 | 10/2008 | Justak | |
| 2013/0195627 A1 | 8/2013 | Glahn et al. | |
| 2015/0285152 A1 | 10/2015 | Hayford et al. | |
| 2015/0322816 A1 | 11/2015 | Schmitz | |
| 2016/0010480 A1 | 1/2016 | Bidkar et al. | |
| 2016/0102570 A1* | 4/2016 | Wilson | F01D 11/02 |
| | | | 277/411 |
| 2016/0108750 A1* | 4/2016 | Wilson | F01D 25/04 |
| | | | 277/411 |
| 2016/0115805 A1 | 4/2016 | Gibson et al. | |
| 2016/0130963 A1* | 5/2016 | Wilson | F01D 11/025 |
| | | | 60/805 |
| 2017/0226883 A1 | 8/2017 | Peters | |
| 2017/0248236 A1 | 8/2017 | Simpson et al. | |
| 2018/0058237 A1 | 3/2018 | Wilson et al. | |
| 2018/0058238 A1 | 3/2018 | Wong et al. | |
| 2018/0058240 A1 | 3/2018 | Chuong et al. | |
| 2018/0340615 A1 | 11/2018 | Simpson et al. | |
| 2020/0149543 A1 | 5/2020 | Lapera et al. | |
| 2020/0165929 A1 | 5/2020 | Mccaffrey et al. | |
| 2020/0165930 A1 | 5/2020 | Mccaffrey et al. | |
| 2020/0165931 A1 | 5/2020 | Mccaffrey | |

FOREIGN PATENT DOCUMENTS

| | | |
|---|---|---|
| EP | 2264338 A1 | 12/2010 |
| EP | 3284983 A1 | 2/2018 |
| EP | 3290646 A1 | 3/2018 |
| EP | 3290755 A1 | 3/2018 |
| EP | 3290756 A1 | 3/2018 |
| EP | 3415798 A1 | 12/2018 |
| EP | 3447344 A1 | 2/2019 |
| FR | 2675560 A1 | 10/1992 |
| WO | 2008140451 A1 | 11/2008 |

OTHER PUBLICATIONS

EP Search Report for U.S. Appl. No. 19/212,347; dated Apr. 23, 2020.
European Search Report for Application No. EP 19 21 2303; dated Apr. 21, 2020.
European Search Report for Application No. EP 19 21 2357.
Final Office Action dated Oct. 6, 2020 in U421508US.
Non Final Office Action dated Jun. 18, 2020 in U421508US.
Non-Final Office Action dated Jul. 9, 2020 in U421507US.

* cited by examiner

HYDROSTATIC SEAL WITH INCREASED DESIGN SPACE

BACKGROUND

Exemplary embodiments pertain to the art of gas turbine engines and, more particularly, to a hydrostatic seal with increased design space that may be used in gas turbine engines.

Hydrostatic advanced low leakage seals, or hybrid seals, exhibit less leakage compared to traditional knife edge seals while exhibiting a longer life than brush seals. Some hybrid seals may be used to seal between a stator and a rotor within a gas turbine engine. The hybrid seal is mounted to one of the stator or the rotor to maintain a desired gap dimension between the hybrid seal and the other of the stator and rotor. The hybrid seal has the ability to 'track' the relative movement between the stator and the rotor throughout the engine operating profile when a pressure is applied across the seal. The hybrid seal tracking surface is attached to a solid carrier ring via continuous thin beams. These beams enable the low resistance movement of the hybrid seal in a radial direction. Prior hybrid seals have design space that is constrained by the beam connection to a shoe of the seal structure, and the need for end stops to limit deflection. The shoe quantity and the beam length limits set the range of operating speeds and radial travel variation while staying within structural limits.

BRIEF DESCRIPTION

Disclosed is a hydrostatic advanced low leakage seal configured to be disposed relatively rotatable components. The seal includes a base. The seal also includes a shoe extending circumferentially. The seal further includes a beam operatively coupling the shoe to the base, the beam having a beam length that is substantially equal to or greater than a circumferential pitch of the shoe.

In addition to one or more of the features described above, or as an alternative, further embodiments may include that the beam is one of a plurality of beams, each of the plurality of beams having a beam length that is substantially equal to or greater than the circumferential pitch of the shoe.

In addition to one or more of the features described above, or as an alternative, further embodiments may include that the plurality of beams are oriented parallel to each other.

In addition to one or more of the features described above, or as an alternative, further embodiments may include a tab and a slot feature, the tab extending from the shoe proximate a first end of the shoe to be engageable with an end stop feature of an adjacent shoe, the slot feature located proximate a second end of the shoe to be engageable with another end stop feature of another adjacent shoe.

Also disclosed is a seal assembly disposed in a gas turbine engine. Included is a first component and a second component, the first component and the second component relatively rotatable components. Also included is a first hydrostatic advanced low leakage seal disposed between the first component and the second component. The seal includes a base operatively coupled to one of the first component and the second component. The seal also includes a first shoe extending circumferentially. The seal further includes a first pair of beams operatively coupling the first shoe to the base, the first pair of beams having a beam length that is substantially equal to or greater than a circumferential pitch of the first shoe.

In addition to one or more of the features described above, or as an alternative, further embodiments may include a second hydrostatic advanced low leakage seal that includes a second shoe extending circumferentially and positioned adjacent the first shoe. Also included is a second pair of beams operatively coupling the second shoe to the base, the second pair of beams each having a beam length that is substantially equal to or greater than a circumferential pitch of the second shoe. Further included is a tab extending from the second shoe proximate an end of the second shoe to be engageable with a slot feature of the first shoe.

In addition to one or more of the features described above, or as an alternative, further embodiments may include that the first pair of beams are oriented parallel to each other and the second pair of beams are oriented parallel to each other.

In addition to one or more of the features described above, or as an alternative, further embodiments may include a deflection limiting element extending axially from the first component, the deflection limiting element disposed within an aperture defined by an end structure of the first pair of beams.

In addition to one or more of the features described above, or as an alternative, further embodiments may include that the deflection limiting element is a post.

In addition to one or more of the features described above, or as an alternative, further embodiments may include that the first component is a stator and the second component is a rotor.

In addition to one or more of the features described above, or as an alternative, further embodiments may include that the seal is operatively coupled to the stator.

In addition to one or more of the features described above, or as an alternative, further embodiments may include that the seal is operatively coupled to the rotor.

Further disclosed is a gas turbine engine including a compressor section, a combustor section, and a turbine section. The gas turbine engine also includes a seal assembly disposed in a gas turbine engine, the seal assembly comprising relatively rotatable components and a first hydrostatic advanced low leakage seal disposed between the relatively rotatable components. The first seal includes a base operatively coupled to one of the first component and the second component. The first seal also includes a first shoe extending circumferentially. The first seal further includes a first pair of beams operatively coupling the first shoe to the base, the first pair of beams having a beam length that is substantially equal to or greater than a circumferential pitch of the first shoe.

In addition to one or more of the features described above, or as an alternative, further embodiments may include a second hydrostatic advanced low leakage seal. The second seal includes a second shoe extending circumferentially and positioned adjacent the first shoe. The second seal also includes a second pair of beams operatively coupling the second shoe to the base, the second pair of beams each having a beam length that is substantially equal to or greater than a circumferential pitch of the second shoe. The second seal further includes a tab extending from the second shoe proximate an end of the second shoe to be engageable with a slot feature of the first shoe.

In addition to one or more of the features described above, or as an alternative, further embodiments may include that the first pair of beams are oriented parallel to each other and the second pair of beams are oriented parallel to each other.

In addition to one or more of the features described above, or as an alternative, further embodiments may include a deflection limiting element extending axially from one of the relatively rotatable components, the deflection limiting element disposed within an aperture defined by an end structure of the first pair of beams.

In addition to one or more of the features described above, or as an alternative, further embodiments may include that the deflection limiting element is a post.

In addition to one or more of the features described above, or as an alternative, further embodiments may include that the relatively rotatable components comprise a stator and a rotor.

In addition to one or more of the features described above, or as an alternative, further embodiments may include that the first seal is operatively coupled to the stator.

In addition to one or more of the features described above, or as an alternative, further embodiments may include that the first seal is operatively coupled to the rotor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
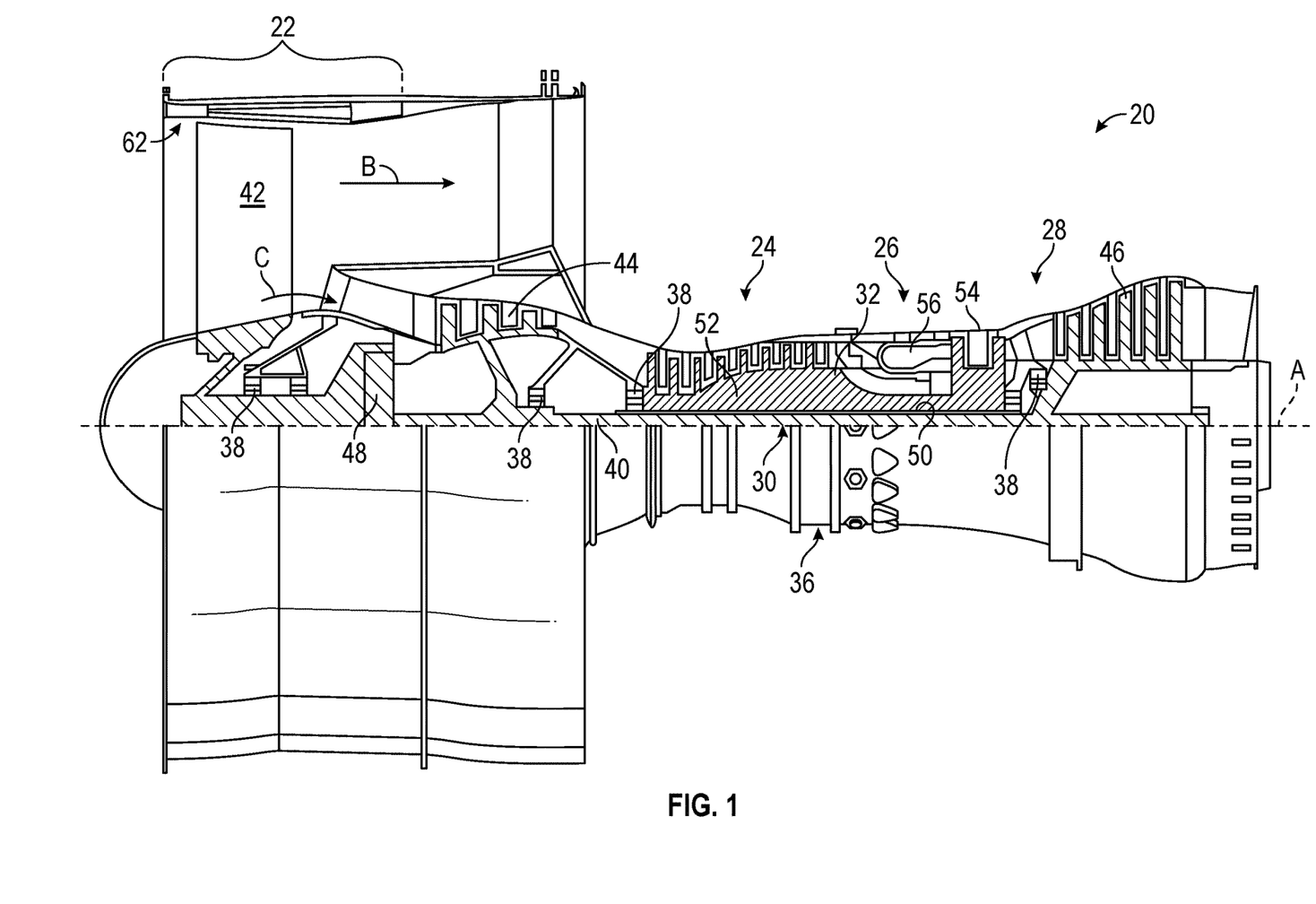
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Figure 2:
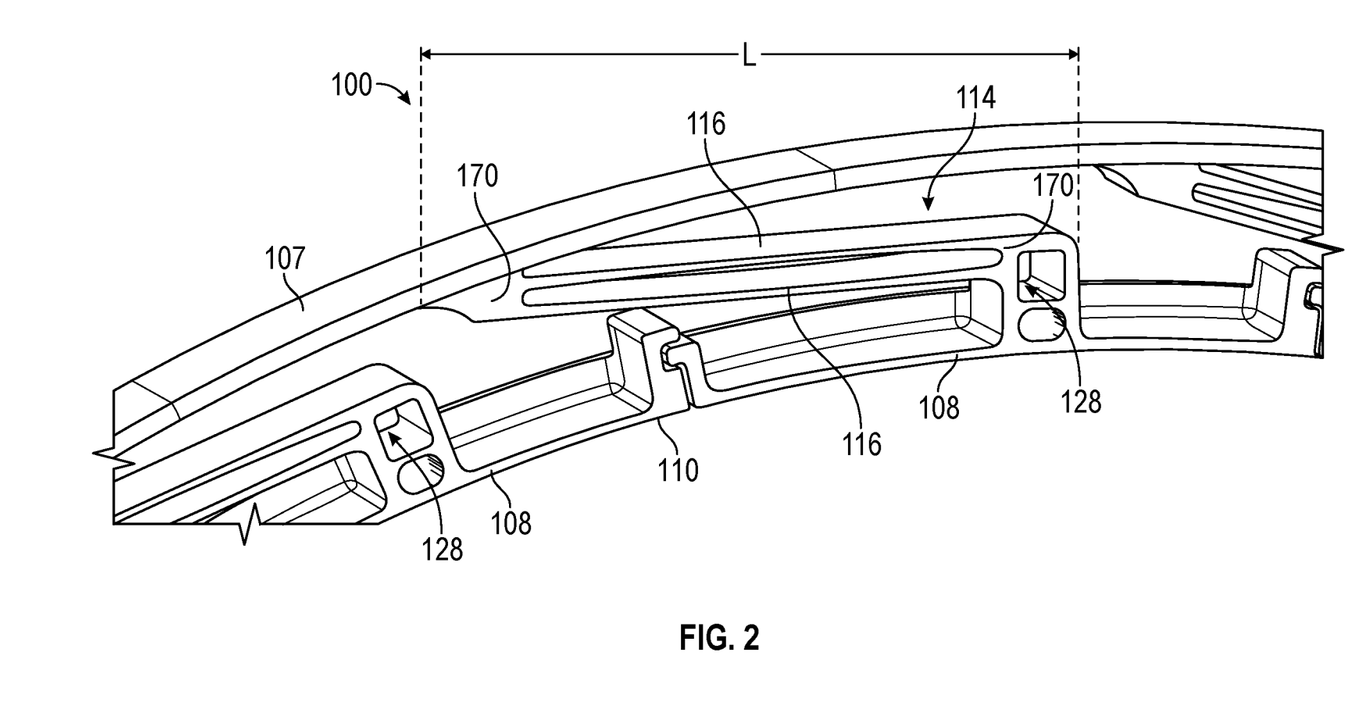
FIG. 2 is a perspective view of a portion of a hybrid seal assembly.

FIG. 2 schematically illustrates a hydrostatic advanced low leakage seal, or hybrid seal, indicated generally at 100. Although the hybrid seal 100 is mounted on a stator in some embodiments, it will be appreciated that the hybrid seal 100 could alternatively be mounted to a rotor. The hybrid seal 100 is intended to create a seal of the circumferential gap between two relatively rotating components, such as a fixed stator and a rotating rotor. The hybrid seal 100 includes a base portion 107 and at least one, but often a plurality of circumferentially spaced shoes 108 which are located in a non-contact position along the exterior surface of the rotor. Each shoe 108 is formed with a sealing surface 110. For purposes of the present disclosure, the term "axial" or "axially spaced" refers to a direction along the longitudinal axis of the stator and rotor, whereas "radial" refers to a direction perpendicular to the longitudinal axis.

Under some operating conditions, it is desirable to limit the extent of radial movement of the shoes 108 with respect to the rotor to maintain tolerances, such as the spacing between the shoes 108 and the facing surface of the rotor. The hybrid seal 100 includes at least one circumferentially spaced spring element 114. Each spring element 114 is formed with at least one beam 116.

Particularly when the hybrid seal 100 is used in applications such as gas turbine engines, aerodynamic forces are developed which apply a fluid pressure to the shoe 108, which is counter balanced with the spring 114, causing it to move radially with respect to the rotor. The initial assembly point has a defined radial gap between the shoe 108 and the rotating surface, with no forces acting upon the shoe 108. In operation, the hybrid seal 100 is used to restrict flow between a high pressure region and a lower pressure region. The pressure drop across the shoe 108 creates a radial force on the shoe which is counter balanced by the spring 114. In operation, when the gap between the shoe 108 and rotor increases, the pressure drop across the axial length of the seal shoe decreases. The reduction in pressure across the shoe 108 reduces the radial force acting on the shoe 108 such that the force balance between the pressure force and the spring 114 force causes the shoe 108 to be pushed radially inwardly toward the rotor, thus decreasing the gap. Conversely, in operation, when the gap closes below a desired level, the pressure drop across the shoe 108 increases, causing an increase in radial pressure force, which overcomes the spring force, thus forcing the shoe 108 radially outwardly from the rotor. The spring elements 114 deflect and move with the shoe 108 to create a primary seal of the circumferential gap between the rotor and stator within predetermined design tolerances.

Energy from adjacent mechanical or aerodynamic excitation sources (e.g. rotor imbalance, flow through the seal, other sections of the engine, etc.) may be transmitted to the seal 100, potentially creating a vibratory response in the seal 100. Such vibratory responses create vibratory stress leading to possible reduced life of the seal 100, and can be large enough to cause unintended deflections of the shoes 108. The vibratory response of the shoes 108 at their natural frequencies, while interacting with mechanical excitation or aerodynamic flow through the system, can reinforce each other causing unwanted vibration levels and possible deflection of the shoes 108 as the vibration is transmitted to all of the shoes 108. Because the resonant frequency response is a function of the square root of the ratio of spring element 114 stiffness to the mass, design considerations include increasing the first order natural frequency by reducing the mass of the shoes 108 and/or increasing the stiffness of the beams 116.

Increasing the stiffness of the beams 116 can only be considered if the available pressure drop is still sufficient to deflect the shoe 108 relative to the rotor. In practice, the beams have a very low spring rate to maintain the force balance with the pressure drop across the shoe 108, and create the desired, small, controlled gap. The hybrid seal 100 operation requires low stiffness beams, making it difficult to achieve large increases in the resonant frequency through stiffness. For this reason it is preferable to decrease shoe mass.

Decreasing the mass of the shoes 108, by increasing the number of shoes 108 in the assembled hybrid seal 100 is beneficial. With conventional hybrid seal designs, the length of the spring 114 would also decrease. However, the radial deflection limiters would impose a fixed circumferential geometric constraint, due to manufacturing and structural requirements and therefore the radial deflection limiters would become a proportionally larger percentage of the circumferential space available for the spring 114 and the deflection limiters. Thus it can be shown, increasing the shoe quantity to reduce the shoe 108 mass, would reduce the circumferential arc length available for shoe 108 and spring 114, and the deflection limiters would impose a proportionally greater reduction in the spring 114 length, which results in a stiffer spring 114. However, the pressure balance force is proportional to the arc length, and would require a reduction in spring stiffness to maintain the ability to control the gap. For a given length of spring 114, the practical means to reduce the stiffness is to reduce the thickness of the beams 116. In practice, the ability to design thin beams is not only limited by manufacturing techniques, but can result in beams which might be easily damaged during manufacture, assembly and use. Therefore, it is desired to decouple the arc length of the shoe 108 from the length of the spring 114.

Figure 3:
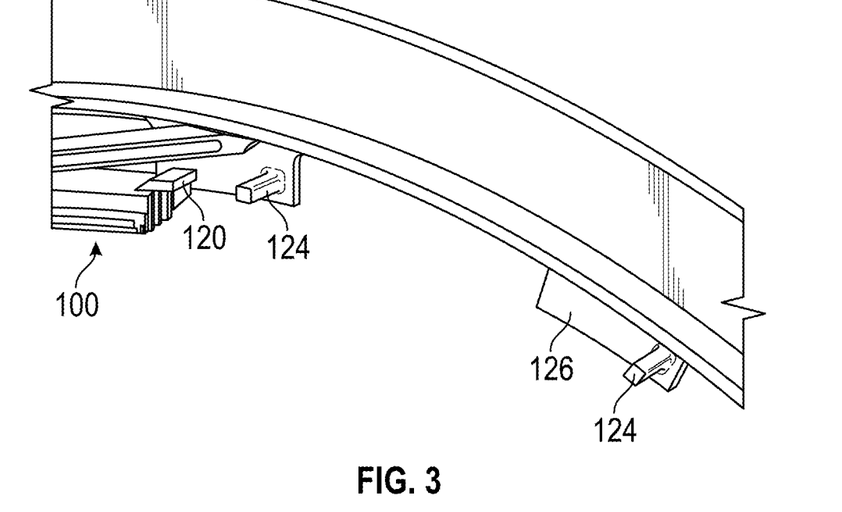
FIG. 3 is a perspective view of a radial deflection limiting element.
Figure 4:
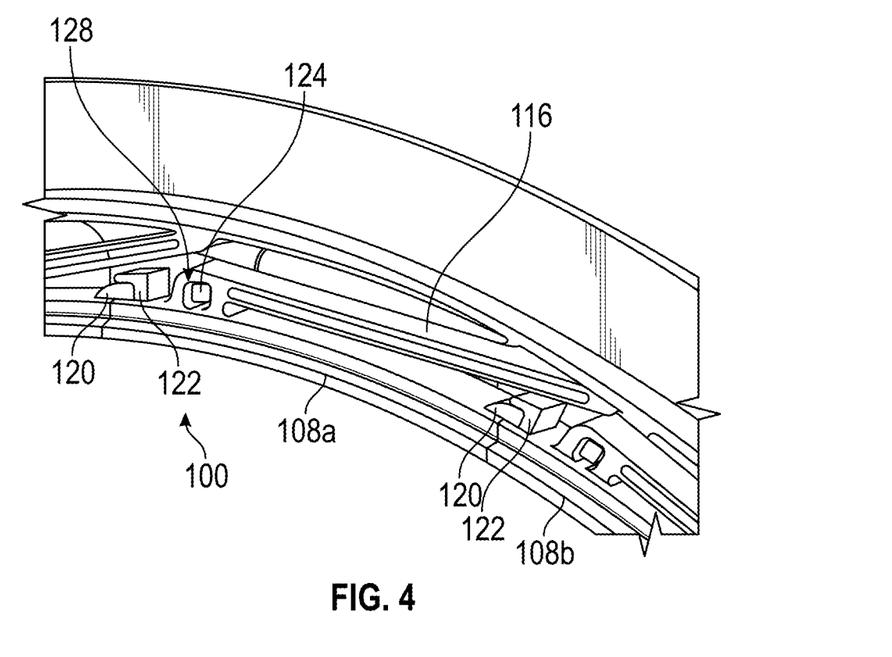
FIG. 4 is a seal portion engaged with the radial deflection limiting element.

Referring now to FIGS. 3 and 4, rather than relying on end stops and radial deflection limit features that extend completely, or nearly completely, between the shoe 108 and the base portion 107 of the seal 100—as with prior hybrid seals—the embodiments disclosed herein include tab and slot features on adjacent shoes 108 that provide deflection shared end stops. As shown in FIG. 4, a tab 120 extending from a first shoe 108a is in engagement with a slot feature 122 extending from a second shoe 108b that is adjacent shoe 108a to limit radial deflection of the seal. The radial deflection is limited by deflection limiting posts 124 extending axially from a rear support 126 of the structure to which the seal 100 is mounted to, such as a stator. Each post 124 is disposed within a respective aperture 128 that is defined by a structure extending radially from the shoe 108.

Each of the above-described deflection limiting features have a small radial height impact, which allows for a reduction in mass of the shoes 108 and providing an increased design space within the seal 100. For example, the location of the beams 116 becomes independent of the shoe 108 since the beams 116 no longer must have a length that is less than the arc length of each shoe 108, as shown well in FIG. 2, without having to increase the radial design space that would be required if the angle of the beams were required to be changed. Additionally, by maintaining the same beam angle with the same length, the substantially parallel beams 116 maintain a generally tangent orientation relative to a rotating seal land and maintain the functionality of the seal 100, but allows the height and length of the beams 116 to become independent of the shoe 108 circumferential pitch.

Figure 5:
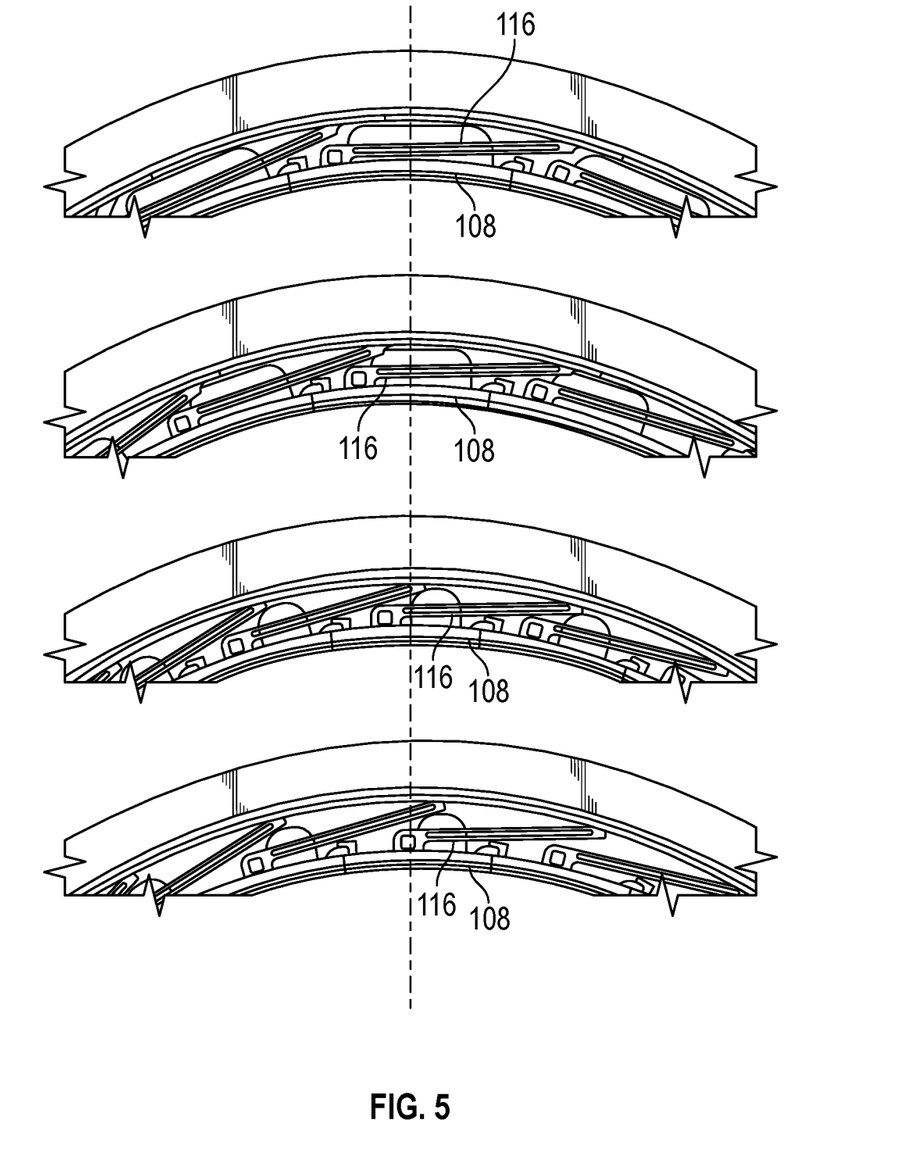
FIG. 5 is a comparison of a plurality of seals having a different number of shoes.

FIG. 5 illustrates a comparison of four embodiments of the seal 100, with each having a different number of shoes 108 and therefore shoe arc lengths. Each illustrated seal 100 includes beams 116 with a common beam length. As shown, the arc length of each shoe 108 in each illustrated seal design does not impact or impair the ability to maintain a beam that is substantially equal to or longer than the arc length of the shoes.

Referring again to FIG. 2, the term "beam length" used herein is defined by length L. The beam length L includes end segments 170, which join the beams 116. The end segments 170 are part of the beams 116, either in an integrally formed manner or via a joining process, and it is the overall length of the beams 116 and the end segments 170 that constitute the beam length. It is this beam length that is substantially equal to or longer than the arc length, or circumferential pitch, of the shoes 108. "Substantially equal" to the arc length of the shoe 108 refers to 95% or more of the shoe length.

Advantageously, decoupling the beam geometry from the shoe circumferential pitch allows for a larger range of radial motion of the seal 100 because the longer beams can deflect more, and at the same stress level. Therefore, shoe quantities can increase, thereby lowering mass to increase the first order natural frequency, while having beams that overlap.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hydrostatic advanced low leakage seal configured to be disposed between relatively rotatable components, the seal comprising:
    a base;
    a shoe extending circumferentially; and
    a beam operatively coupling the shoe to the base, the beam having a beam length that is substantially equal to or greater than a circumferential pitch of the shoe, wherein the beam extends past an end of the shoe, wherein the beam is one of a plurality of beams, each of the plurality of beams having a beam length that is substantially equal to or greater than the circumferential pitch of the shoe, and wherein each beam extends past an end of the shoe.

2. The seal of claim 1, wherein the plurality of beams are oriented parallel to each other and the plurality of beams are secured to a center portion of the shoe.

3. The seal of claim 1, further comprising a first tab and a first slot feature, the first tab extending from the shoe proximate a first end of the shoe to be engageable with a second slot feature of an adjacent second shoe, the first slot feature located proximate a second end of the shoe to be engageable with a third tab of an adjacent third shoe.

4. A seal assembly disposed in a gas turbine engine, the seal assembly comprising:
    a first component;
    a second component, the first component and the second component are relatively rotatable components; and
    a first hydrostatic advanced low leakage seal disposed between the first component and the second component, the seal comprising:
        a base operatively coupled to one of the first component and the second component;
        a first shoe extending circumferentially; and
        a first pair of beams operatively coupling the first shoe to the base, the first pair of beams having a beam length that is substantially equal to or greater than a circumferential pitch of the first shoe, wherein the first pair of beams extend past an end of the first shoe.

5. The seal assembly of claim 4, further comprising a second hydrostatic advanced low leakage seal comprising:
    a second shoe extending circumferentially and positioned adjacent the first shoe;
    a second pair of beams operatively coupling the second shoe to the base, the second pair of beams each having a beam length that is substantially equal to or greater than a circumferential pitch of the second shoe, wherein the second pair of beams extend past an end of the second shoe; and
    a tab extending from the second shoe proximate an end of the second shoe to be engageable with a slot feature of the first shoe.

6. The seal assembly of claim 5, wherein the first pair of beams are oriented parallel to each other and the first pair of beams are secured to a center portion of the first shoe and the second pair of beams are oriented parallel to each other and the second pair of beams are secured to a center portion of the second shoe.

7. The seal assembly of claim 4, further comprising an element extending axially from the first component, the element disposed within an aperture defined by an end structure of the first pair of beams, wherein the element limits deflection of at least a portion of the seal assembly.

8. The seal assembly of claim 7, wherein the element is a post.

9. The seal assembly of claim 4, wherein the first component is a stator and the second component is a rotor.

10. The seal assembly of claim 9, wherein the seal is operatively coupled to the stator.

11. A gas turbine engine comprising:
    a compressor section;
    a combustor section;
    a turbine section; and
    a seal assembly disposed in a gas turbine engine, the seal assembly comprising relatively rotatable components and a first hydrostatic advanced low leakage seal disposed between the relatively rotatable components, the seal comprising:
- a base operatively coupled to one of the relatively rotatable components;
- a first shoe extending circumferentially; and
- a first pair of beams operatively coupling the first shoe to the base, the first pair of beams extend past an end of the first shoe and having a beam length that is substantially equal to or greater than a circumferential pitch of the first shoe.

12. The gas turbine engine of claim 11, further comprising a second hydrostatic advanced low leakage seal comprising:
- a second shoe extending circumferentially and positioned adjacent the first shoe;
- a second pair of beams operatively coupling the second shoe to the base, the second pair of beams extend past an end of the second shoe and having a beam length that is substantially equal to or greater than a circumferential pitch of the second shoe; and
- a tab extending from the second shoe proximate an end of the second shoe to be engageable with a slot feature of the first shoe.

13. The gas turbine engine of claim 12, wherein the first pair of beams are oriented parallel to each other and the first pair of beams are secured to a center portion of the first shoe and the second pair of beams are oriented parallel to each other and the second pair of beams are secured to a center portion of the second shoe.

14. The gas turbine engine of claim 11, further comprising an element extending axially from one of the relatively rotatable components, the element disposed within an aperture defined by an end structure of the first pair of beams, wherein the element limits deflection of at least a portion of the seal assembly.

15. The gas turbine engine of claim 14, wherein the element is a post.

16. The gas turbine engine of claim 11, wherein the relatively rotatable components comprise a stator and a rotor.

17. The gas turbine engine of claim 16, wherein the first seal is operatively coupled to the stator.

* * * * *